United States Patent [19]
Niehoff

[11] Patent Number: 5,139,198
[45] Date of Patent: Aug. 18, 1992

[54] MODEL TRAIN TRACK FOR ELECTRICAL MODEL TRAINS

[76] Inventor: Jörg Niehoff, Wissmannstr. 59, D-2870 Delmenhorst, Fed. Rep. of Germany

[21] Appl. No.: 645,564

[22] Filed: Jan. 24, 1991

Related U.S. Application Data

[63] Continuation of Ser. No. 372,345, filed as PCT/DE87/00584, Dec. 9, 1987, Pat. No. 4,993,631.

[30] Foreign Application Priority Data

Dec. 11, 1986 [DE] Fed. Rep. of Germany ....... 3642350

[51] Int. Cl.⁵ ........................................... A63H 19/30
[52] U.S. Cl. ................................. 238/10 B; 238/10 E
[58] Field of Search ................. 238/10 R, 10 E, 10 F, 238/10 B, 10 A, 2; 403/294, 292, 401, 402; 446/444, 111; 273/186 B

[56] References Cited

U.S. PATENT DOCUMENTS

| | | | |
|---|---|---|---|
| 2,584,388 | 2/1952 | Husband | 238/10 B |
| 2,854,195 | 9/1958 | Bittles | 238/10 B |
| 3,382,815 | 5/1968 | Higuchi et al. | 238/10 R |
| 3,464,624 | 9/1969 | Christiansen | 238/10 E |
| 4,403,733 | 9/1983 | Bach et al. | 238/10 E |

FOREIGN PATENT DOCUMENTS

| | | | |
|---|---|---|---|
| 0058126 | 8/1982 | European Pat. Off. | 446/111 |
| 0804175 | 2/1951 | Fed. Rep. of Germany | 238/10 R |
| 0812532 | 7/1951 | Fed. Rep. of Germany | 238/10 R |
| 1136813 | 9/1962 | Fed. Rep. of Germany | 403/294 |
| 2056663 | 5/1972 | Fed. Rep. of Germany | 238/10 B |
| 2161720 | 6/1973 | Fed. Rep. of Germany | 446/111 |
| 1246030 | 10/1960 | France | 238/10 B |

*Primary Examiner*—Robert J. Oberleitner
*Assistant Examiner*—Mark T. Le
*Attorney, Agent, or Firm*—Eckert Seamans Cherin & Mellott

[57] ABSTRACT

Tracks for electric model railways have a track body provided with ties and metal rails secured to its upper surface. The electrical and mechanical connections between adjacent track bodies occur in two end-face connection zones. In order to obtain improved electrical and mechanical connections, a recess is formed in the track body at the connection zones of each track. The recess is open toward a bottom and toward a connection plane, and is not visible from above. A separate connecting element has two identical heads symmetric about a central axis. The heads are snapped into the recesses of two adjoining tracks to provide a secure and invisible connection.

13 Claims, 4 Drawing Sheets

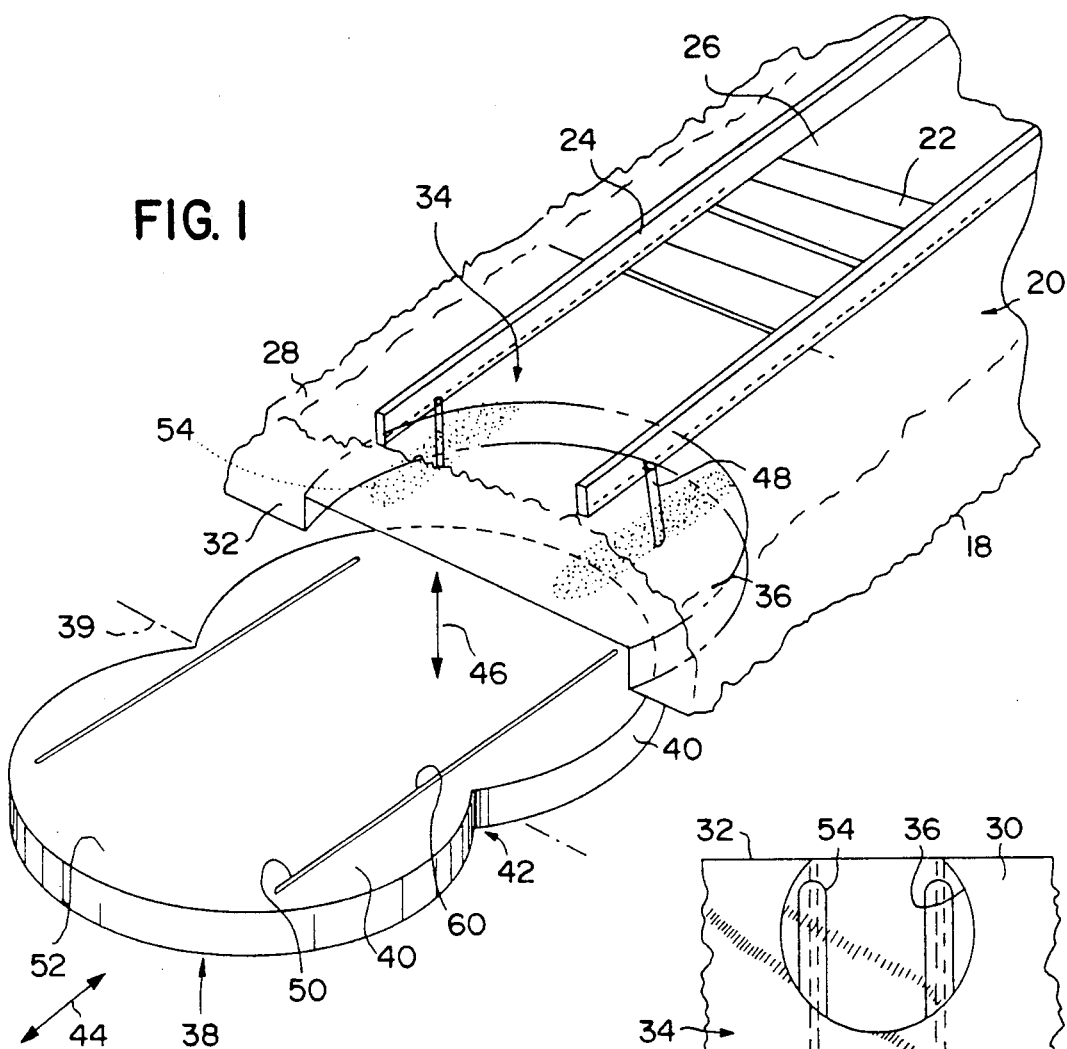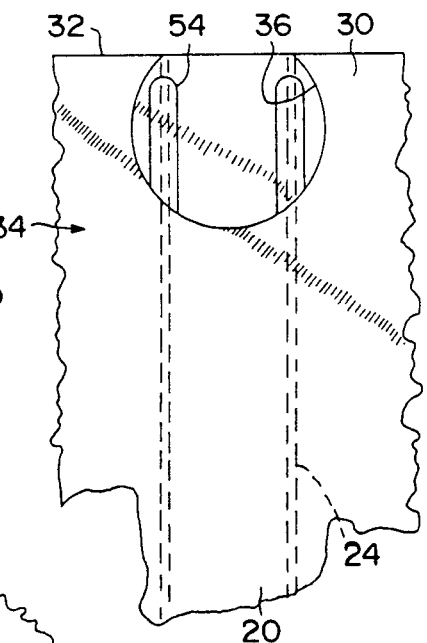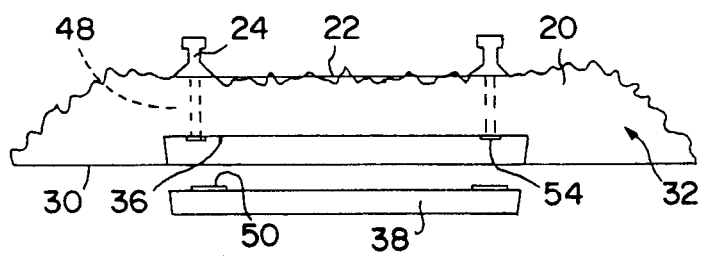

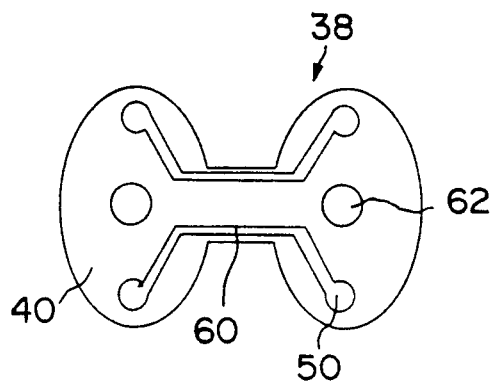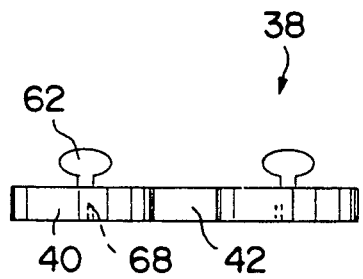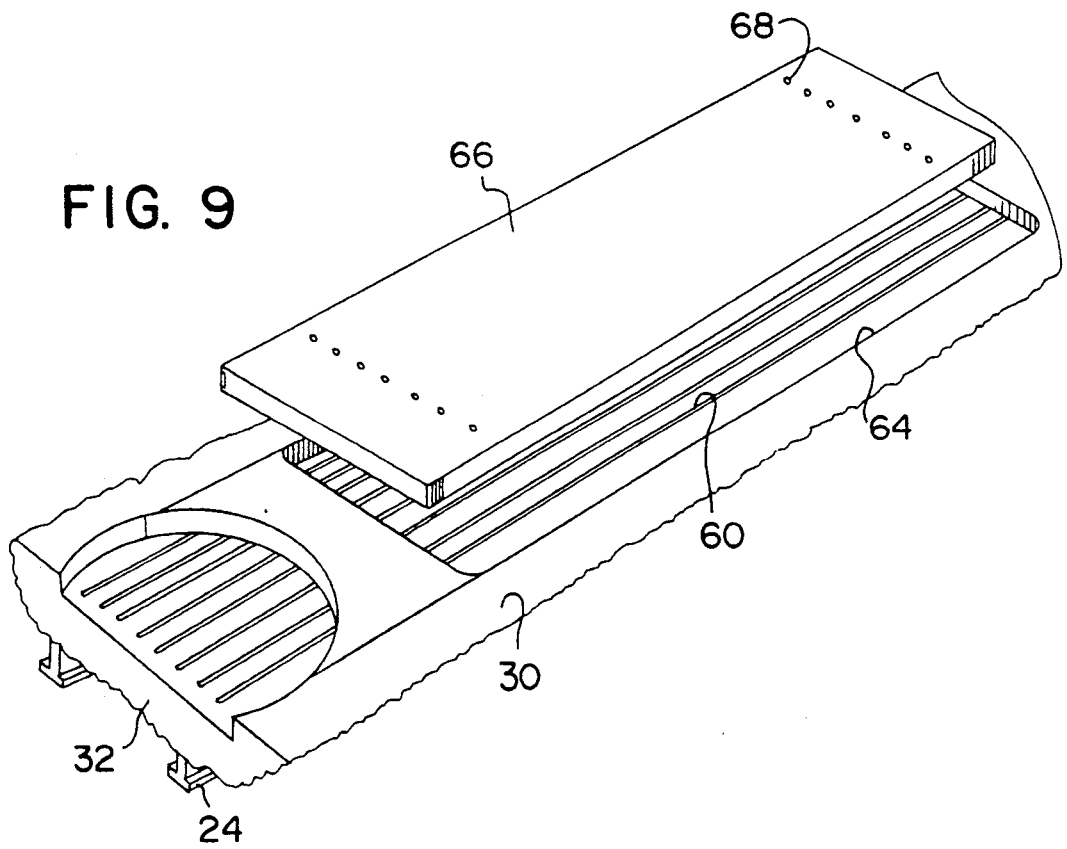

MODEL TRAIN TRACK FOR ELECTRICAL MODEL TRAINS

This is a continuation of Ser. No. 372,345, filed as PCT/DE87/00584, Dec. 9, 1987, now U.S. Pat. No. 4,993,631.

BACKGROUND OF THE INVENTION

1. Field of the Invention

The present invention pertains to a model train track for electrical model trains, comprising an oblong track body with trapezoidal section and ballast structure, on the top side of which two metal rails are fastened on railroad ties, which said body has a lower side serving as a support and has two end face connection zones for the electrical and mechanical connection of one adjacent rail each.

In this prior-art model train track, the track body is made of bent thin sheet metal which is embossed to have ballast structure and is open at the bottom. Adjacent model train tracks are joined together at the end face connection zones by electrical contact studs which are electrically connected to the rails and a third rail and also ensure the mechanical stability of the rails connected to one another, besides the electrical contact.

As is known, the goal and the intent of many electrical model train enthusiasts is to have a train set that is as realistic as possible, i.e., that is a true replica of the real train. The rolling stock available meets this wish very well; the locomotives and railroad cars or freight cars are so realistic that they are true-to-scale replicas of the full-size originals and thus create the impression of the full-size originals albeit on a smaller scale.

However, careful, realistic imitation of a real railroad track with a similar accuracy of details has not yet become possible in the case of model train tracks. The known and commercially available model train tracks have straight edges and practically flat limiting surfaces, which cannot be seen in the full-scale original. In addition, there are often unattractive transition zones in the connection zones of two adjacent rails which are manifested as a gap or as a displacement, projection or the like and cause the connection zone of two rails to be easily recognizable and at any rate to act as an unattractive salient feature for the observer. The connection zones of the prior-art model train tracks are also unsuitable for a permanent mechanical connection of adjacent rails. The contact studs, which actually only serve the purpose of establishing electrical connection, only bring about a relatively weak mechanical connection, so that the above-described gaps between adjacent rails can occur. The solution that is often resorted to in practice is to attach the individual model train tracks on a solid support. e.g., a board, by means of screws. Even though this increases the mechanical stability of the set, the flexibility is greatly reduced. The fastening of the rails is also highly labor-intensive and time-consuming.

SUMMARY OF THE INVENTION

Based on this, the basic task of the present invention is to propose a model train track which permits a more realistic imitation and—as a prerequisite to this—provides connection zones which have a coupling that ensures a substantially more precise and mechanically better connection of adjacent tracks.

Based on the prior-art model train track of the type described in the introduction, this task is accomplished such that each of the two connection zones has a recess that is open toward the lower side and toward the connection plane, which said recess has an undercut, and that a separate connecting member, which is symmetrical to the connection plane and one half of which can be inserted into the said recess of the connection zone in a form-locking manner, is provided.

Consequently, according to the present invention, the connection of adjacent rails is not ensured by electrical connecting means and mechanical coupling means provided exclusively on the model train tracks proper, but an additional connecting member, which ensures the reliable mechanical connection of adjacent rails and thus creates the precondition for a very precise, gap-free end-face joining of adjacent tracks, is also provided for the mechanical and preferably also the electrical connection of adjacent rails. A special advantage of the connections thus obtained is the fact that every individual model train track can be pushed out of a series of interconnected tracks individually in the upward direction, since no contact studs projecting toward the connection plane, which make it difficult to push the model train tracks together in their longitudinal direction, are needed.

Mechanical connection of adjacent model train tracks over a large surface area, i.e., an effective mechanical connection, can be achieved with the connecting members. The recesses can be prepared relatively simply; the recesses preferably also have the simplest geometric shape possible, e.g., a limbic shape, a hexagonal shape, the shape of a push-button and the like.

The junction of two adjacent model train tracks is always clean and gap-free due to the fact that the connection zones are designed according to the present invention. If the model train tracks are designed properly, the connection zones are practically no longer recognizable and contact studs are not needed, so that the rails are slender even in the area of the connection zones, corresponding to the full-size original; at any rate, the connection zones are not thickened which would otherwise be caused by contact studs.

In a variant of the present invention, it is proposed that the connecting members also be used for the electrical connection of adjacent model train tracks. The connecting part has for this purpose contact surfaces electrically connected to one another which are located on its top side or its lateral sides. On the bottom side or the lateral sides of the recesses of the model train tracks, there are contact zones corresponding to the said contact surfaces, and at least two of the said contact zones are electrically connected to the rails. Thus, these connecting members ensure not only mechanical, but also electrical connection of adjacent rails. It is highly favorable that the electrical connection is possible not only for two electrical contacts, as in the case of the prior-art model train tracks, but a substantially greater number of connections are also possible. The relatively large surface area of the contact members, which can occupy, e.g., 50 to 70% of the width of a model train track, is also advantageous in this case. The relatively large surface makes it possible to accommodate a greater number of contact surfaces that can be made sufficiently large without the need to maintain excessive precision in production. The electrical contact surfaces of the connecting members are also folding-symmetrical to the connection plane, so that the two halves of the connecting member can assume identical functions and thus they are interchangeable without problems.

In an alternative embodiment, the electrical contact surfaces are provided on the end faces of the model train tracks rather than on the connecting members. They are preferably resilient and can be forced elastically behind the connection plane, so that they do not prevent a close, accurately fitting contact from being formed between two adjacent end faces, while still ensuring a very precise resilient contact for current conduction.

The connecting members are preferably also folding-symmetrical to a symmetry plane extending through the longitudinal center of adjacent model train tracks. This improves the possibility of universal use, and the assembly of model train tracks with these members is simplified. If the bottom side and the top side of the connecting members are also of identical design and each is provided with contact surfaces, special arrangement or alignment of the connecting members is no longer necessary, since they will always fit.

In general, the connecting members have two head zones which are connected to one another by a central web. This web is narrower than the head zones as a result of which interlocking is achieved. A second interlocking, which acts at right angles to the plane of the two rails, is additionally possible. For example, a pushbutton connection, which is provided between each half of the connecting member and a part of the recess of the model train track, is provided for this purpose.

The web between the two heads of the connecting members can preferably be made elastic, as a result of which the two connection zones of adjacent model train tracks are elastically pulled toward one another in the connected state, so that a gap in the connection zone is prevented from forming with certainty and very good mechanical stability is achieved. However, the electrical connection is also improved by such a measure.

The track body is preferably essentially made as a solid plastic body. Manufacturing from plastic permits, on the one hand, very simple insulation of the electrical conductors, but especially of the rails. Additional insulating means, which are needed in the case of track bodies made of metal, are unnecessary. This greatly simplifies manufacture. However, the plastic track bodies also have the advantage that it is not necessary that the edges be straight, and any desired shape, which also occurs in the full-scale original, can be imitated. Consequently, the track body will have a substantially more natural shape and a substantially improved appearance. The track bodies are preferably manufactured according to the molding process from a plastic, the rails are co-molded and the railroad ties are shaped at the same time.

Finally, it is proposed that the connecting members be provided with electrical connections for electrical power supply to the tracks and possibly to other parts as well. Consequently, electrical power is supplied to the connecting members rather than to the tracks, as a result of which the manufacture of the tracks is simplified and, in particular, it is no longer necessary to deliberately use so-called connection tracks and normal tracks, i.e., tracks without electrical connection, to assemble a train set. The electrical connections can be simply made on the connecting members; for example, plug contacts, into which connecting wires can be plugged if a connecting member is to be used as a connection piece, can be provided on each connecting member.

BRIEF DESCRIPTION OF THE DRAWINGS

Further characteristics and advantages of the present invention will appear from the other claims, as well as the following description of examples of the present invention, which are to be considered to be nonlimiting examples and will be explained in greater detail with reference to the drawing. In this drawing, FIG. 1 shows a perspective view of a connecting zone of a model train track and of a connecting member, FIG. 2 shows a front view of the arrangement shown in FIG. 1, FIG. 3 shows a bottom view of the end zone of a model train track as shown in FIG. 1, FIG. 7 shows a top view of another embodiment of a connecting member, FIG. 8 shows a side view of the connecting member according to FIG. 7, FIG. 9 shows a perspective view of the lower surface of a model train track with a multiplicity of strip conductors.

DETAILED DESCRIPTION OF THE PREFERRED EMBODIMENTS

Figure 4:
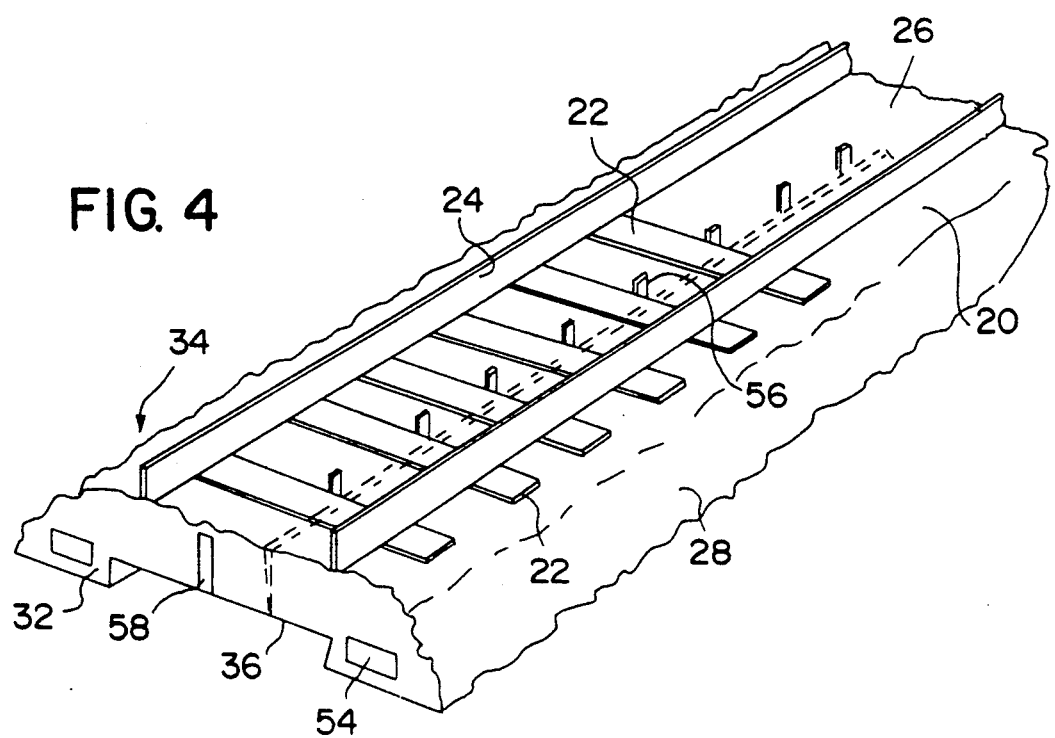
FIG. 4 shows a perspective view of a model train track with end-face contact surfaces and a third rail.

The first example according to FIGS. 1 through 3 shows a model train track for electrical model trains, comprising an oblong track body 20 having trapezoidal section and ballast structure 18, railroad ties 22 and metallically conducting rails 24. The track body 20 is made of plastic according to the molding process, e.g., by dead-mold casting or injection molding. The railroad ties 22 are also shaped at the same time. The rails 24 are placed into the mold and connected to the track body 20 and the rails 22 during molding. The track body 20 has a solid cross section, its top side 26, which is essentially flat, and its oblique lateral surfaces carry the ballast structure 18, and its lower side 30 is flat, as is apparent from FIGS. 2 and 3.

The end face is located in a connection plane 32 in which both the flat front edge of the track body 20, including its ties 22, and the ends of the metallic rails 24 are located. Consequently, these rails neither project over the connection plane 32, e.g., with contact studs, nor are they recessed relative to the said plane. This arrangement makes it possible to butt-join two model train tracks end to end and to achieve flush, butt-joined fitting of the rails due to the careful flat finishing of the end face. There will be no gap between adjacent model train tracks if adjacent tracks are placed tightly against each other. Should a small gap develop, it is not practically recognizable, since the irregular limitation of the end face in the zone of the connection plane 32 prevents smaller gaps from being recognizable due to its ballast structure 18.

In each of the two end-face connection zones 34 (only one of them is shown in FIGS. 1 through 3), there is provided a recess 36, which is not recognizable from the outside in the case of two connected model train tracks, since the recess is only open toward the front surface and toward the lower side 30. The recess 36 is intended to receive one half of a connecting member 38, as is shown in FIGS. 1 and 2 below the recess 36. The connecting member 38 is folding-symmetrical to an axis 39, which is located in the connection plane 32 in the case of assembled railroad tracks It is also folding-symmetrical to a longitudinal axis, which is located on the longitudinal center line of the tracks in the case of assembled railroad tracks.

Consequently, the connecting member 38 consists of two heads 40 of identical design, which are intended to be received by a recess 36 each, as well as of a web 42 of smaller cross section, which, as is seen. e.g., in FIG. 1, may be definitely short, but, e.g., as is shown in FIG. 7, may have a certain length. The recess 36 has an undercut. Together with the head 40 that is broader than the web 42, this undercut brings about interlocking of the connecting member 38 inserted. In other words, the connecting member inserted cannot be pulled out of the track body 20 in the direction of the arrow 44, but it can be pressed into its recess 36 from the bottom in the direction of arrow 46.

The recess 36 also has another undercut in the direction of the arrow 46. As is especially apparent from FIG. 2, the recess 36 is dovetailed and its lateral surfaces are oblique. Therefore, if a head 40 of the connecting member 38 is pushed into the recess 36 in the direction of the arrow 46, a snap-in effect is obtained, i.e., the head 40 is held in the recess 36 in an essentially nonpositive manner, but also partly in an interlocking manner.

The connecting members 38 are preferably made of a plastic, but they are made of a plastic different from that used for the track body 20 and the railroad ties 22. The plastic of the connecting members 38 should be slightly more elastic and especially should not break. In contrast, the plastic of the track body 20 and the railroad ties 22 can be relatively hard; it is also possible to use a very inexpensive plastic with a high filler content for this purpose. The coordination with the material of the connecting members 38 should be performed such that when the connecting members 38 are used, the material of the track body 20 can never be damaged, and, in particular, the limiting surfaces of the recess 36 should not be damaged or chip or peel off. The design of the recess 36 shown in the figures is also constructed such that no hazardous corners, edges or projections, which might break off on pressing in of the connecting member 38, are formed.

The electrical connection, which is also ensured by the connecting member 38, will be described below: as is apparent from FIGS. 1 and 2, the two rails 24 are connected via electrical connectors 48 to contact zones 54 which are located on the top side of the recess 36. Contact surfaces 50 corresponding to the said contact zones 54, which are arranged in pairs and connected to one another electrically, are provided on the top side 52 of the connecting member 38. On inserting the connecting member 38 into a recess 36, the contact zones 54 come into conducting contact with the contact surfaces 50, so that the electrical contact between the individual rails 24 is established via the connecting members 38.

The above-described snap-in connection, which acts in the direction of the arrow 46, is highly advantageous for the electrical contact, since the contact zones 54 are pressed against the contact surfaces 50. These zones can be embedded in the plastic in question in any desired manner, e.g., as flat, thin metal strips, as strips of a conducting paint applied and the like. The connection via the connectors 48 can also be constructed as desired, the only thing important being a reliable electrical connection for practical purposes. The contact surfaces 50 and the contact zones 54 are so large that contact between them is always established, regardless of manufacturing tolerances.

The mechanical and electrical connection described, which is established via the recesses 36 and the connecting members 38, is invisible in the assembled state. The mechanical connection is very reliable and strong, since strong forces can be transmitted via the relatively large surfaces. The electrical connection is also highly reliable and involves the use of simple means. When assembling a model train track, the individual model train tracks are simply pressed on heads 40 of the connecting members 38 from the top, and pushing together of the model train tracks laterally is unnecessary. By the same token, every individual model train track can also be pushed up in the direction of the arrow 46 and removed from a closed assembly.

In the embodiment according to FIG. 4, a model train track with the third rail 56 is shown, but the design is otherwise practically identical to the embodiment according to FIGS. 1 through 3. However, the construction of the electrical contact is changed: the electrical contact is established via contact zones 54 located on the end face in the connection plane 32, which zones are inserted in recesses on the front side and are mounted elastically such that they normally project slightly above the connection plane 32, rather than via the connecting members 38, which ensure exclusively the mechanical connection. The rails 24 and the third rail 56 are connected to these contact zones. On assembly of two model train tracks of this design and in the case of movement in the direction of the arrow 46, the contact zones 54 of adjacent tracks slide on one another and establish a direct contact in the assembled state without current conduction via the connecting members 38. The contact zones 54 are slightly rounded, so that there are no projecting edges in the case of vertical assembly of the rails.

A reinforcing insert 58, which extends at right angles to the lower side 30 and is, e.g., in the form of a metal section, is additionally shown in the embodiment according to FIG. 4. This insert ensures that the track body 20 made of plastic cannot warp or bend. Consequently, the insert 58 reinforces the track body 20, which is manufactured from plastic, in its longitudinal direction, as a reinforcement. Individual parts of the track body 20 are thus prevented from lying hollow on a support.

Figure 5:
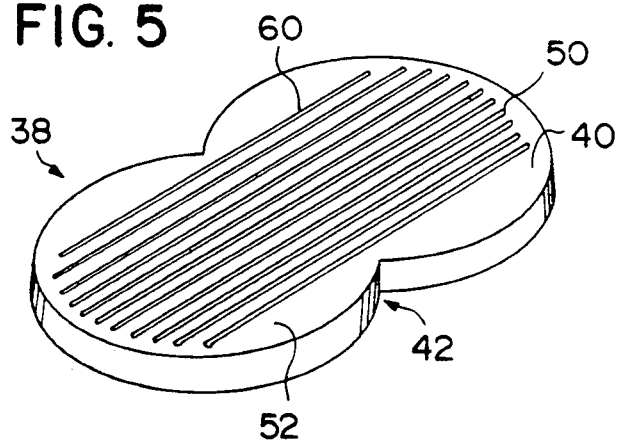
FIG. 5 shows a perspective view of a connecting member similar to the connecting member shown in FIG. 1.
Figure 6:
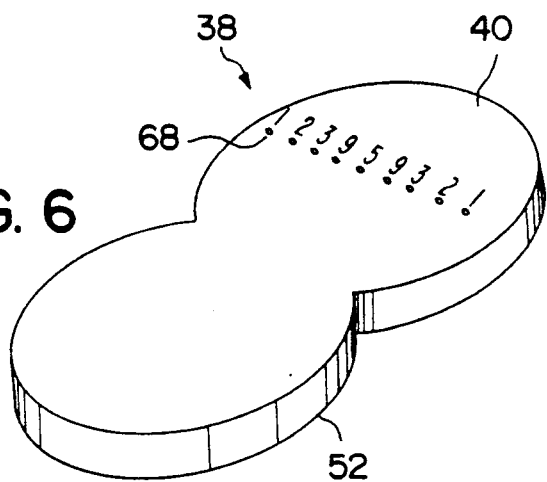
FIG. 6 shows a perspective view of the bottom side of the connecting member according to FIG. 5.

FIGS. 5 and 6 show a connecting member 38 which permits a total of eleven separate connections between adjacent tracks. Besides the two strip conductors 60 needed for normal travel, the additional strip conductors can be used for any desired function, e.g., switching, signals train lighting and the like. A corresponding model train track is shown in FIG. 9.

The bottom side of the connecting member 38 according to FIG. 5 can have the same design as the top side 52 shown in FIG. 5. This offers the advantage that the connecting members 38 cannot be misoriented during assembly; such misassembly occurs if in the embodiment according to FIGS. 1 to 3 those surfaces (the bottom surface, see FIG. 6) of the connecting member 38, which surface does not have strip conductors 60 and contact surface 50 at all, is brought in contact with the contact surfaces 50.

However, in the embodiment shown in FIGS. 5 and 6, the bottom side of the connection member 38 carries no strip conductors, so that care must be taken to ensure proper orientation of the connecting member 38 during the assembly of tracks. Instead, a number of jacks or contact openings 68, via which electrical contacting of individual strip conductors 60 can be ensured, are provided on the bottom side. According to the present invention, current is supplied to the rails 24 via the connecting members 38 rather than via so-called connector rails. Due to the jacks shown, it is possible to use each connecting member 38 as an electrical connecting member. This simplifies the construction of a model train set, since it is not necessary to make a distinction between electrical connection parts and normal parts.

A different construction of the connecting members 38 is shown in the embodiment according to FIGS. 7 and 8. The purpose of this figure is especially to explain that the connecting members may basically have any shape, i.e., their heads may be hexagonal, triangular, T-shaped, etc. The heads 40 shown in FIGS. 7 and 8 are oval and are connected to one another by a markedly narrower web 42. This web is elastic, being made, e.g., of a rubber material, and has elasticity in the direction of the line connecting the two heads 40. These heads make it possible to pull together tracks connected to one another in the direction of the arrow 44, so that their end faces abut against one another under pressure.

The connecting member 38 according to this embodiment additionally has push-button-like projections 62 which snap elastically into recesses of matching shape in the track body 20. Frictional and interlocking connection of the track with the connecting member 38 is thus achieved, and it is ensured that the elastic tension can occur in the longitudinal direction as was mentioned above.

FIG. 9 shows a track which is called an "intelligent rail" and interacts with a connecting member 38 as is shown in FIGS. 5 and 6. Some of the strip conductors 60 are fully covered and some of them are freely accessible under a recess zone 64, which recess zone 64 can be covered with a plate 66. Contact jacks 68 are arranged in the said plate 66, via which jacks the individual strip conductors 60 are electrically accessible (as an alternative to or in addition to the design according to FIG. 6).

The additional strip conductors 60 (those needed besides power supply) are used for various functions. For example, it is possible to fasten a signal directly on the track body 20 and to wire it to the strip conductors 60, if necessary, via contact jacks 68 of a plate 66. Numerous functions of a model train can be controlled via the additional strip conductors 60 without additional cables. Track indicators, sliding contacts, etc, are also possible.

Figure 10:
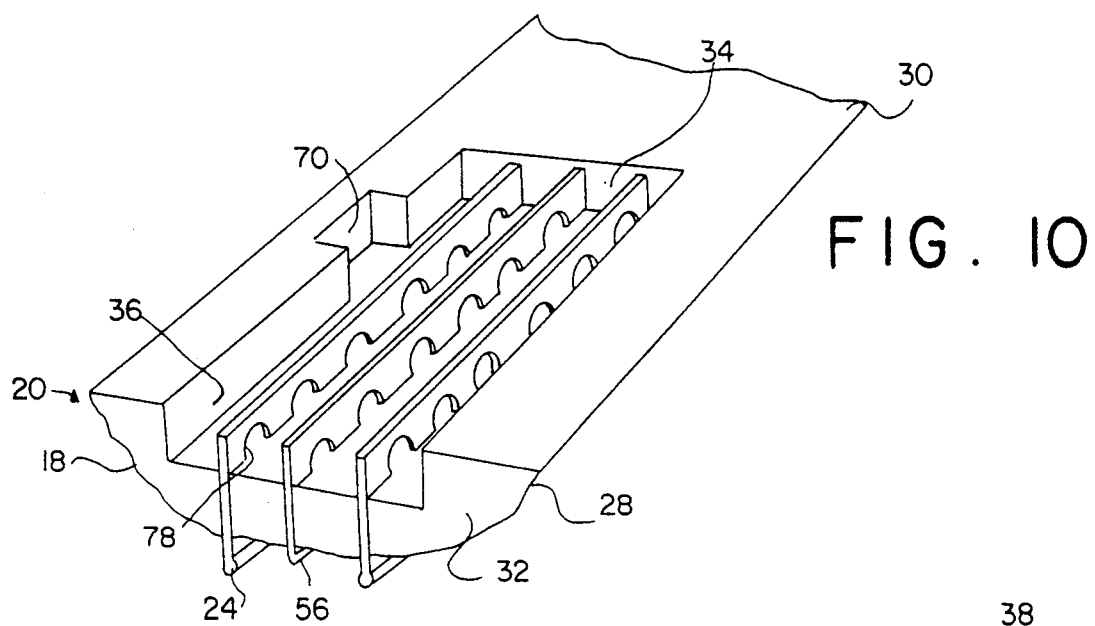
FIG. 10 shows a perspective bottom view of an end zone of a model train track.
Figure 11:
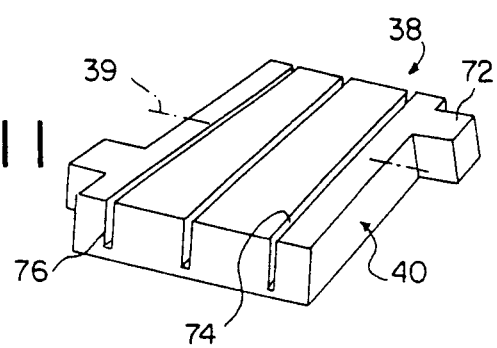
FIG. 11 shows a perspective top view of a connecting piece for the model train track according to FIG. 10.
Figure 12:
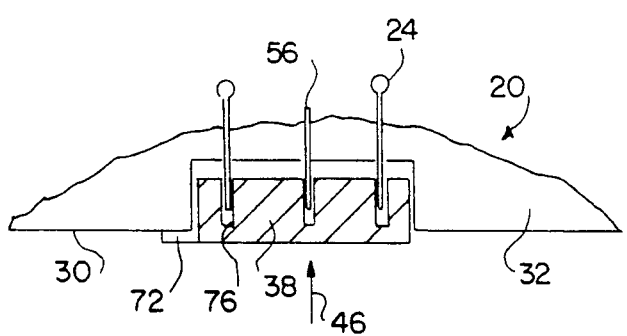
FIG. 12 shows a sectional view through the connection plane of two model train tracks according to FIG. 10 and a connecting piece according to FIG. 11 connecting the said model train tracks at the moment of insertion of the connecting piece.

Another embodiment is shown in FIGS. 10 through 12. The recess 36 in the end zone of the rail shown (FIG. 10) is no longer folding-symmetrical to a longitudinal axis of the track body 20 in this embodiment. The connecting member 38 (FIG. 11) is also correspondingly no longer folding-symmetrical to the corresponding longitudinal midplane, but it is rotationally symmetrical to the connection plane 32. The recess 36 and correspondingly also the two halves of the connecting member 38 are parallelepipedic, and an undercut is produced by a pocket 70, which is also parallelepipedic and has the same height as the recess 36, and interlocking connection is thus achieved. A parallelepipedic projection 72 fits into the said pocket 70 with a small clearance at the connecting member 38, and the said projection also has the same thickness as the rest of the connecting member 38. The track bodies 20 consequently have differently shaped connection zones 34 at their two ends, the difference being in the orientation of one of the pockets 70; the pocket points toward a lateral surface 28 in one end zone and toward the other lateral surface 28 in the other end zone. This is reflected in the connecting member 38, as is apparent from FIG. 11.

In the embodiment according to FIGS. 10 through 12, the sections of the rails 24 and the third rail 56 are so high (cf. FIGS. 10 and 12) that they practically reach through the entire track body 20 but their lower edge remains slightly above the bottom side 30 of the track body 20, so that they are free in the downward direction and consequently project in a contactable manner only in the zone of the two end side recesses 36, whereas they otherwise only project above the track body 20, i.e., they are embedded and insulated in the downward direction. The relatively high-web design of the rails 24 and of the third rail 56 makes it possible to do without electrical conductors 48 or specially designed contact zones 54 and the rails 24 and the third rail 56 can be contacted directly on the third rail. To ensure this, the connecting member 38 according to FIG. 11 has slots 74 worked in its main surfaces, which pass through at the distance of the rails 24 and of the third rail 56 and carry metallic contacts 76 on their inner walls, which come into contact with the two rails 24 and with the third rail 56 if they project freely in the downward direction in the recess 36 on pressing the connecting member 38 into a connection zone 34 (cf. FIG. 12, arrow 46). The contacts 76 extend over the entire length of the slot 74 and thus they electrically connect the rails 24 and the third rail 56 of two adjacent track bodies 20.

To save material and improve the embedding of the rails 24 and of the third rail 56, as well as to achieve greater strength of the track body 20, the rails 24 and the third rail 56 have perforations 78, which are, e.g., circular or oval and are shown in FIG. 10. The high-web rails 24 and the third rail 56 also act as an insert 58; they have a high moment against bending at right angles to the bottom side 30 of the track body 20 and thus they ensure that the said bottom side 30 remains flat and cannot warp.

FIG. 12 shows how the track body 20 and the connecting member 38 are pressed against each other; this is symbolized by the arrow 46. On pressing in, the zones of the rails 24 and of the third rail 56 which project freely in the downward direction, will come to lie against the contacts 80, and on the other hand, the projection 72 reaches into the pocket 70. FIG. 12 shows the state shortly before completion of the assembly.

Figure 13:
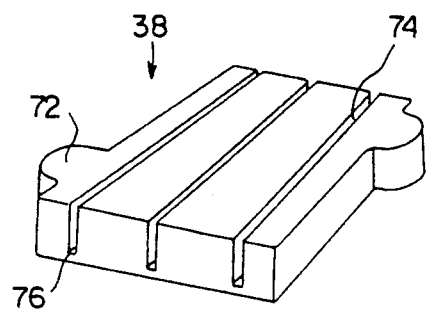
FIG. 13 shows a perspective view of a connecting piece similar to that shown in FIG. 11.

Instead of parallelepipedic projections 72, it is also possible to use semicircular projections 72 (prisms with semicircular bases), as is shown by the connecting member 38 according to FIG. 13. The pockets must also be shaped correspondingly.

The connecting members 38 can be provided with through-holes for screws. On the other hand, the bottom surface of the connecting members 38 can be provided with an adhesive film, but the bottom side can also be applied to a support. Consequently, the connecting members 38 can be fastened to a support, e.g., a large plate, according to various methods, after which the track bodies 20 are pressed on from the top, as a result of which invisible fastening but firm holding of the entire track set is obtained.

I claim:

1. A model train track for electrical model trains, comprising:

an oblong track body with a trapezoidal section and a ballast structure, at least two metal rails being fastened on railroad ties on a top of the track body, the track body having a bottom side serving as a support, and two end-facing connection zones for electrical and mechanical connections, each of said two connection zones having a recess open toward the bottom side and toward a connection plane and a separate connecting member symmetrical to the connection plate, each said connection zone having only one recess, the recesses for said two connection zones being open only toward the bottom side and only toward the connection plane, said recess having an undercut selected from the group consisting of a taper towards the connection plane and a pocket, the connecting member having two heads of identical shape, and said heads being insertable into the recess of the connection zone in an interlocking manner, the connecting member having contact surfaces that are electrically connectable to one another, and contact zones corresponding to said contact surfaces being provided on the bottom side of the recesses of the track body, at least two of said contact zones being electrically connected to the at least two said rails.

2. The model train track according to claim 1, wherein the connecting member has a web between its two heads, which web is elastic.

3. The model train track according to claim 1, further comprising two projections, each of which can releasably snap into a matching recess in the track body, the projections being disposed on the connecting member in the zone of its two heads.

4. The model train track according to claim 1, wherein the track body and the railroad ties are made of plastic with a solid cross section, and further comprising an insert reinforcing said track body, embedded in the track body.

5. The model train track according to claim 1, wherein the connecting member has strip conductors and contact zones on two principal surfaces thereof.

6. The model train track according to claim 5, further comprising contact jacks on the connecting member, connected to the strip conductors in a conducting manner for electrical connection to the strip conductors.

7. The model train track according to claim 1, further comprising strip conductors, electrically connecting the two connection zones, the strip conductors being provided on the bottom side of the track body.

8. The model train track according to claim 1, wherein the connecting member is made of plastic.

9. The model train track according to claim 1, wherein said contact zones are further electrically connected to a third rail.

10. The model train track according to claim 3, wherein the projections are push-button like.

11. The model train track according to claim 4, wherein the track body and railroad ties are made of a hard plastic.

12. The model train track according to claim 5, wherein said principal surfaces are a top side and a bottom side of the connecting member.

13. The model train track according to claim 7, wherein the strip conductors are provided in a recess on the bottom side of the track body.

* * * * *